(12) United States Patent
Neal

(10) Patent No.: US 6,978,969 B1
(45) Date of Patent: Dec. 27, 2005

(54) FLY-DRIVE VEHICLE

(76) Inventor: Larry R. Neal, P.O. Box 927, Boyd, TX (US) 76023

( * ) Notice: Subject to any disclaimer, the term of this patent is extended or adjusted under 35 U.S.C. 154(b) by 0 days.

(21) Appl. No.: 10/961,754

(22) Filed: Oct. 8, 2004

Related U.S. Application Data

(63) Continuation-in-part of application No. 10/794,444, filed on Mar. 5, 2004.

(60) Provisional application No. 60/451,935, filed on Mar. 5, 2003.

(51) Int. Cl.[7] ............................................ B64C 27/22
(52) U.S. Cl. ...................................... 244/23 B; 244/2
(58) Field of Search ..................... 244/17.11, 17.19, 244/17.23, 17.27, 23 B, 2, 102 R

(56) References Cited

U.S. PATENT DOCUMENTS

| | | | |
|---|---|---|---|
| 2,110,563 A * | 3/1938 | Thaon | 244/17.11 |
| 2,427,936 A | 9/1947 | Wales, Jr. | |
| 2,461,348 A | 2/1949 | Pentecost | |
| 2,563,731 A | 8/1951 | Masterson | |
| 2,933,271 A | 4/1960 | Maltby | |
| 3,248,073 A | 4/1966 | Blythe | |
| 3,371,886 A * | 3/1968 | Schertz | 244/2 |
| 3,558,082 A | 1/1971 | Bennie | |
| 4,010,919 A | 3/1977 | Breuner | |
| 4,863,351 A | 9/1989 | Fischer et al. | |
| 5,078,335 A | 1/1992 | David | |
| D335,119 S | 4/1993 | Haseloh et al. | |
| 5,544,844 A | 8/1996 | Groen et al. | |
| 5,915,649 A | 6/1999 | Head | |
| 6,062,508 A * | 5/2000 | Black | 244/8 |
| 6,293,492 B1 | 9/2001 | Yanagisawa | |
| 6,589,017 B1 | 7/2003 | Solheim | |
| 6,877,690 B1 * | 4/2005 | Bragg | 244/2 |
| 2003/0029965 A1 * | 2/2003 | Kusic | 244/17.11 |

* cited by examiner

*Primary Examiner*—Peter M. Poon
*Assistant Examiner*—Timothy D. Collins
(74) *Attorney, Agent, or Firm*—Eric Karich

(57) ABSTRACT

A fly-drive vehicle is disclosed including a vehicle body, a motor mounted on the vehicle body, at least one rotor rotatably attached to the vehicle body, a pair of wheels each rotatably attached to a lower portion of the vehicle body, a drive propeller rotatably coupled to the vehicle body, a transmission for selectively transferring mechanical power from the motor to at least one of the pair of wheels or to the drive propeller, and a front wheel control mechanism. The fly-drive vehicle also includes a landing gear assembly for raising and lowering the pair of wheels with respect to the vehicle body and a folding rotor shaft assembly for raising and lowering the rotor with respect to the vehicle body.

6 Claims, 4 Drawing Sheets

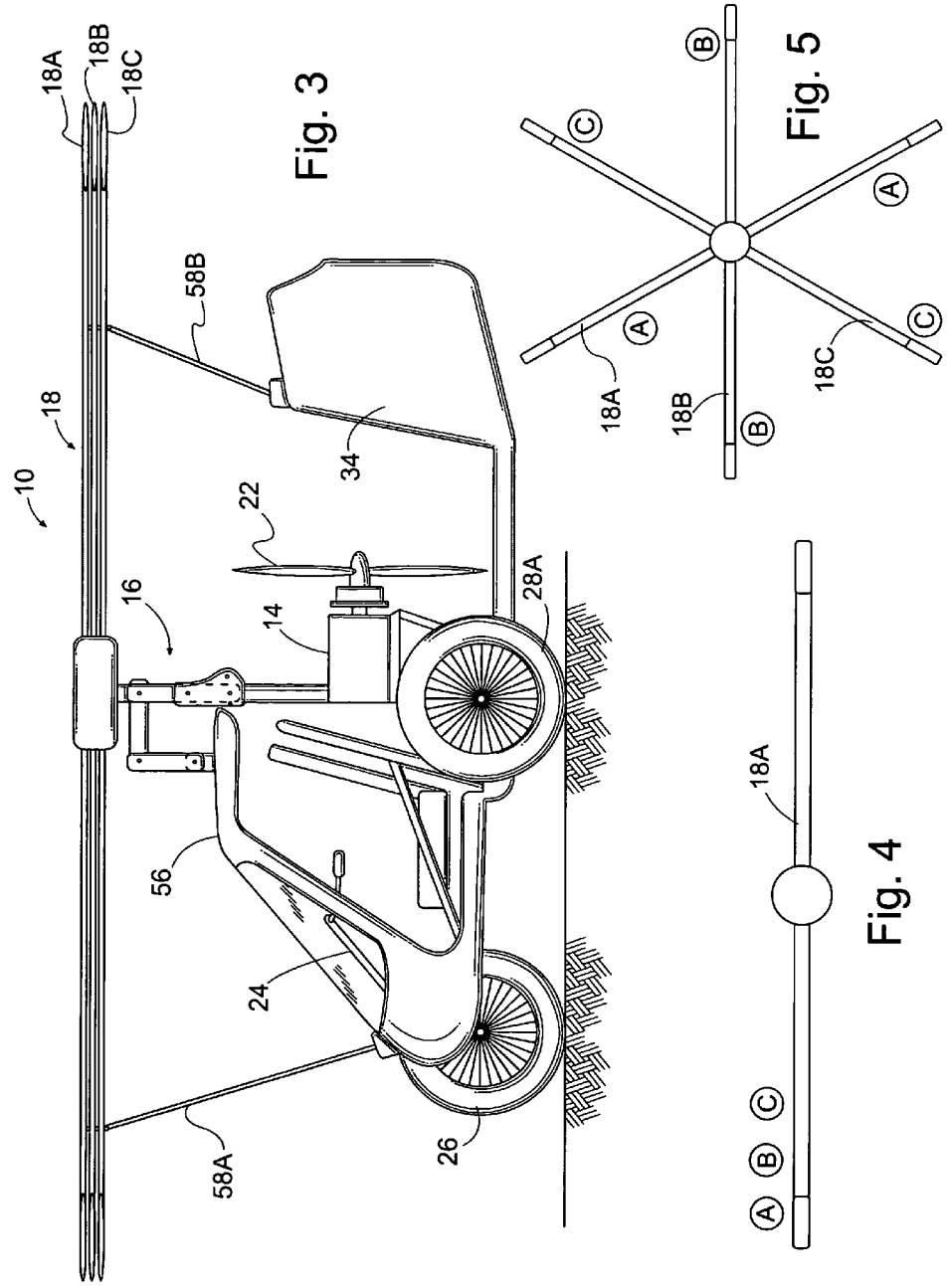

FLY-DRIVE VEHICLE

CROSS-REFERENCE TO RELATED APPLICATIONS

This application for a utility patent is a continuation-in-part of a previously filed utility patent application Ser. No. 10/794,444, filed Mar. 5, 2004. This application also claims the benefit of U.S. Provisional Application No. 60/451,935, filed Mar. 5, 2003. Each of these related applications is incorporated herein by reference in its entirety.

BACKGROUND OF THE INVENTION

1. Field of the Invention

This invention relates generally to vehicles, and more particularly to vehicles capable of traveling both on the ground and through the air.

2. Description of Related Art

The following art defines the present state of this field:

Head, U.S. Pat. No. 5,915,649, describes a roadable helicopter that comprises of a vehicle that drives like a conventional car in its road configuration, and converts to fly like a helicopter in its flight configuration. The operator of the helicopter only needs to press a button to initiate the conversion from one configuration to the other. To facilitate the flight configuration, the helicopter is preferably equipped with a dual, coaxial counter-rotating rotor system to provide lift, propulsion, and control in the flight configuration. In the road configuration, however, the rotor system automatically folds into a rotor bay formed in the rear of the helicopter. The roadable helicopter may also include an automatic control/stability/navigation system that permits fully automatic flight.

David, U.S. Pat. No. 5,078,335, describes a parafoil sail and a propeller propulsion system that are adapted to be fixed to the motorcycle for converting a motorcycle into a flying vehicle. The invention includes a clutching and declutching mechanism which, on control, drives either the driving wheel of the motorcycle or the propeller.

Groen et al., U.S. Pat. No. 5,544,844, describes an auto gyro containing a teetering semi-rigid rotary wing with rigid rotor blades. The angle of attack (blade pitch) of the rotor blades is fully adjustable in flight continuously over an operational range, and varies along the blade length. A pre-rotator rotates the rotor blades up to takeoff speed at minimum drag, no lift and optimum engine efficiency. Engine power is disconnected from the rotor blades and their angle of attack is changed for optimum lift to facilitate smooth vertical takeoff. Rotor blade pitch is likewise adjusted during vertical landing. In flight, rotor blade angle of attack is varied to adjust autorotation, lift and drag at any flight airspeed. On the ground, the rotary wing is braked to prevent rotation. The auto gyro may roll, pitch, or yaw, with complete independence of blade pitch with respect to all other relative motions. The pedals have disproportionate forward and backward motions. The auto gyro has retractable gear capable of fail-safe gear-up landing.

Bennie, U.S. Pat. No. 3,558,082, describes an auto gyro aircraft that includes rocket engines mounted on a warpable rotating wing for operating same in a helicopter mode. The engine and propeller are mounted on the fuselage for operation of the aircraft in an auto gyro mode. Cyclic and collective pitch controls operate through a swash plate, including a flexible membrane, which controls a movable servotab to cause aerodynamic warping of the wing. Thrust vector controls or spoilers are mounted aft of the rocket engines to control the effective thrust therefrom.

Prewitt, U.S. Pat. No. 4,059,247, teaches an aircraft that takes off as a helicopter, then the rotor pylon folds backwards so that the rotors function as the rear control surfaces of the aircraft. When ready to land, the rotors "spin up" as they function to brake the aircraft, and then the rotor pylon pivots back to an upright position so that the rotors can facilitate an auto gyro landing.

A. A. Blythe, U.S. Pat. No. 3,248,073, describes rotor devices for rotorcraft such as auto gyros, the rotor devices being uniquely suited for use in land or sea vehicles that incorporate a rotor device. The rotor devices are adapted to fold backwards downwardly, and are adapted to be stored in the body of the vehicle. The Blythe reference also discussed folding the rotors chord-wise over the rear of the vehicle.

W. L. Masterson, U.S. Pat. No. 2,563,731, describes a land, sea, and air plane wherein the rotor can be raised and lowered using a rack and pinion system.

Yanagisawa, U.S. Pat. No. 6,293,492 B1, describes a one-man helicopter that contains a drive transmission that transmits driving force to upper and lower rotors using first and second planet gear mechanisms provided with a common carrier. When the common carrier is rotated by a motor, a differential motion is generated between the two planet gear mechanisms. This results in the rotors being rotated at different velocities, which can be used to control yaw. A fore-and-aft swing mechanism and right-and-left swing mechanism depend from the lower end of a vertical shaft on which the rotors are supported. Moving a stick forward or backward, or to either side, tilts the vertical shaft in the same direction. When the stick is not subjected to a controlling force, the vertical shaft reverts automatically to its original vertical state. H. T. Pentecost, U.S. Pat. No. 2,461,348, describes another embodiment of a helicopter of the co-axial wing type.

N. B. Wales, Jr., U.S. Pat. No. 2,427,936, describes an control mechanism for helicopters having co-axial counter-rotation rotors. The motor can be engaged through a transmission to either the rotors or to a road drive shaft for driving the vehicle.

Solheim, U.S. Pat. No. 6,589,017 B1, describes an aircraft rotatable airfoil assembly in the nature of a helicopter machine and having two airfoils diametrically disposed about an axis of rotation. Air baffles are mounted on the radially inner and radially outer ends of the airfoils and for blocking the vortices inherently generated by the orbiting of the airfoils. The baffles thereby avoid vortices which reduce the lift force on the aircraft by eliminating the air flow from under the airfoil to above the airfoil and around the airfoil inner and outer ends. The assembly can be included in an airliner or an automobile. The aircraft is arranged for vertical and horizontal flight.

L. J. Maltby, U.S. Pat. No. 2,933,271, describes landing gear for helicopters that includes a combined hydraulic actuator and shock absorber.

Fischer et al., U.S. Pat. No. 4,863,351, describes an airscrew for propelling an aircraft. The aircrew has a hub, a jacket and a plurality of propeller blades secured by blade necks to the hub. These blade necks are secured to the hub with symmetric or equal angular spacings around the hub between neighboring radial blade neck axes. Each propeller blade has a longitudinal axis. At least certain of these longitudinal blade axes extend at different sweep angles relative to the respective radial blade neck axis. When the sweep angle is positive the respective sweep of the blade is a positive sweepback with a trailing sweep of the respective blade relative to a rotational direction of the airscrew. When the sweep angle is negative the respective sweep of the blade is a negative sweep forward with a leading sweep of the respective blade relative to a rotational direction of the airscrew. These differing sweep angles achieve a substantial noise reduction compared to conventional airscrews having a completely symmetrical construction.

Haseloh et al., U.S. Des. 335,119, illustrates a particular design of a gyroplane.

The above-described references are hereby incorporated by reference in full.

The prior art teaches various flying vehicles; however, the prior art does not teach a flying vehicle having the advantages described below. The present invention fulfills these needs and provides further related advantages as described in the following summary.

SUMMARY OF THE INVENTION

A fly-drive vehicle is disclosed including a vehicle body, a motor mounted on the vehicle body, at least one rotor rotatably attached to the vehicle body, a pair of wheels each rotatably attached to a lower portion of the vehicle body, a drive propeller rotatably coupled to the vehicle body, a means for selectively transferring mechanical power from the motor to at least one of the pair of wheels or to the drive propeller, and a front wheel control mechanism. The fly-drive vehicle also includes a means for raising and lowering the wheels with respect to the vehicle body and/or a means for raising and lowering the rotor with respect to the vehicle body.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 1A is a front elevational view of the front landing gear;

FIG. 3 is a side elevation view of another embodiment of the fly-drive vehicle of FIG. 1 wherein the vehicle body includes a partially enclosed canopy, the rotor shaft assembly is collapsible, and three rotors are rotatably attached to the upper end of the rotor shaft assembly;

FIG. 4 is a top plan view of the rotors of FIG. 3 in an aligned configuration for storage when not in use;

FIG. 5 is a top plan view of the rotors of FIG. 3 in an operational configuration for flight;

DETAILED DESCRIPTION OF THE INVENTION

Figure 1:
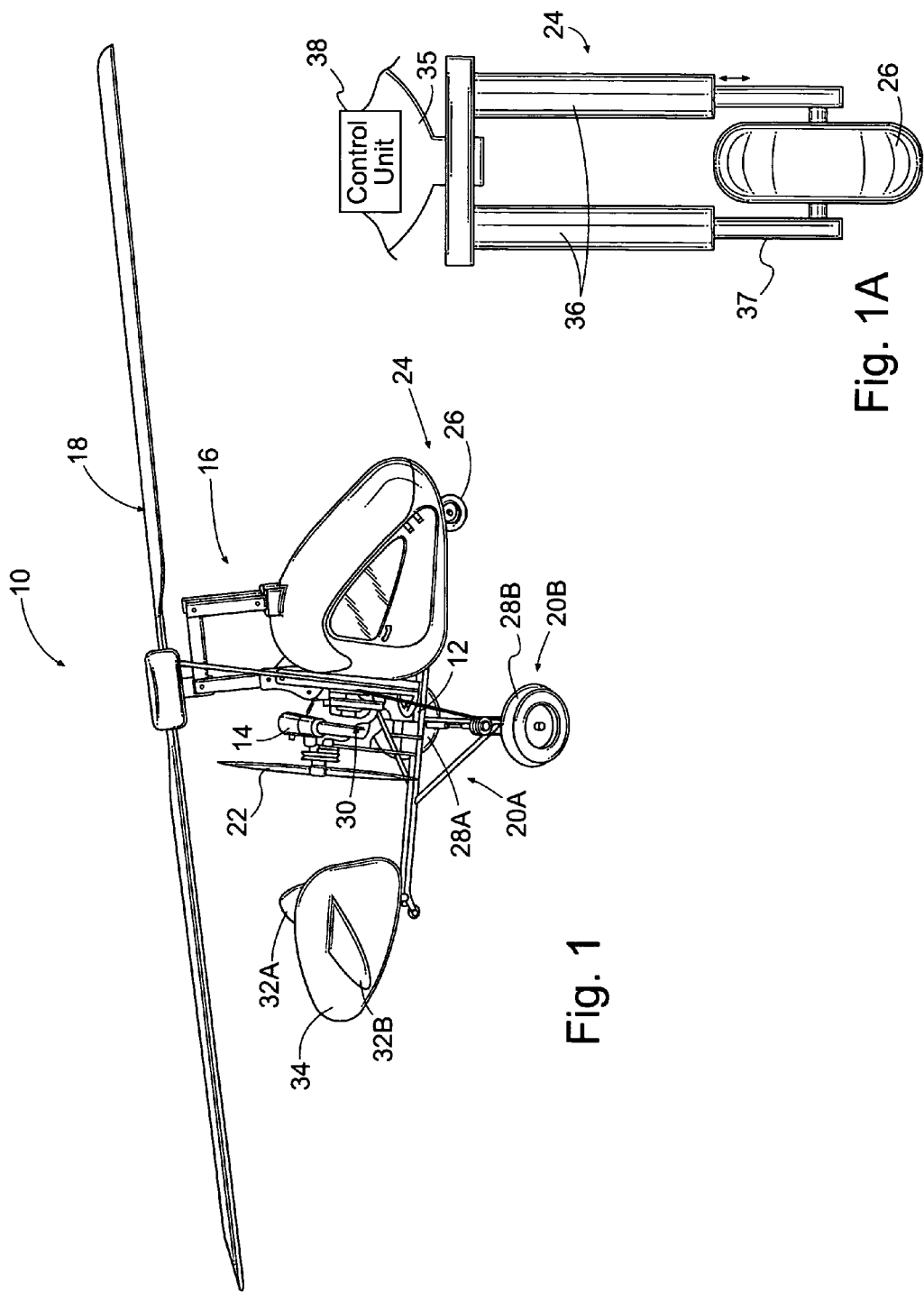
FIG. 1 is a perspective view of one embodiment of a fly-drive vehicle including a vehicle body, a rotor rotatably attached to an upper end of a rotor shaft assembly extending upward from an upper portion of the vehicle body, a pair of landing gear assemblies attached to a lower portion of the vehicle body, and a front landing gear at a front of the vehicle body.

FIG. 1 is a perspective view of one embodiment of a fly-drive vehicle 10. As described in detail below, the fly-drive vehicle 10 includes a motor that selectively drives at least one rear wheel or a propeller. The fly-drive vehicle 10 is capable of traveling both on the ground and through the air (i.e., is capable of flight). Having three wheels, the fly-drive vehicle 10 may be considered a "flying motorcycle."

In the embodiment of FIG. 1 the fly-drive vehicle 10 includes a vehicle body 12, a motor 14 mounted on the vehicle body 12, a rotor shaft assembly 16 extending upward from a upper portion of the vehicle body 12, a rotor 18 rotatably attached to a upper end of the rotor shaft assembly 16, a pair of landing gear assemblies 20A and 20B attached to a lower portion of the vehicle body 12 on opposite sides, a drive propeller 22, and a front wheel control mechanism 24. A front wheel 26 is rotatably attached to the front wheel control mechanism 24, and a pair of rear wheels 28A and 28B are rotatably attached to lower portions of the landing gear assemblies 20.

As shown in FIG. 1, the front wheel 26 is mounted forward of the rear wheels 28A and 28B. In general, the front wheel control mechanism 24 allows a user of the fly-drive vehicle 10 to control the front wheel 26. In the embodiment of FIG. 1 the single rotor 18 includes a pair of rotor blades. In general, the fly-drive vehicle 10 may have one or more rotors, each including one or more blades.

In the embodiment of FIG. 1 the fly-drive vehicle 10 also includes a drive selector 30. The drive selector 30 is mechanically coupled between the motor 14, at least one of the pair of rear wheels 28A and 28B, and the drive propeller 22, and serves as a means for selectively transferring mechanical power developed by the motor 14 to at least one of the rear wheels 28A and 28B or to the drive propeller 22.

In the embodiment of FIG. 1 the fly-drive vehicle 10 also includes a pair of horizontal stabilizers 32A and 32B and a vertical stabilizer 34 mounted to a rear of the vehicle body 12 opposite the front wheel control mechanism 24.

FIG. 1A is a front elevational view of the front wheel 26. In one embodiment, the front wheel 26 is mounted on a front portion 35 of the vehicle body 12 (shown in FIG. 1) and operably controlled by the front wheel control mechanism 24. In one embodiment, the front wheel control mechanism 24 includes a pair of air cylinders 36 that receive and operably control a pair of pistons 37 that are attached to the front wheel 26. A control unit 38 controls the flow of gas into and out of the air cylinders 36 to control the distance between the front wheel 26 and the front portion 35. The front wheel 26 is operably controlled to operate in coordination with the rear wheels 28A and 28B, as described in greater detail below.

While one embodiment of the front wheel control mechanism 24 is described in detail, alternative embodiments of the front wheel control mechanism 24 may be devised by those skilled in the art, and such alternatives should be considered within the scope of the invention as claimed.

Figure 2:
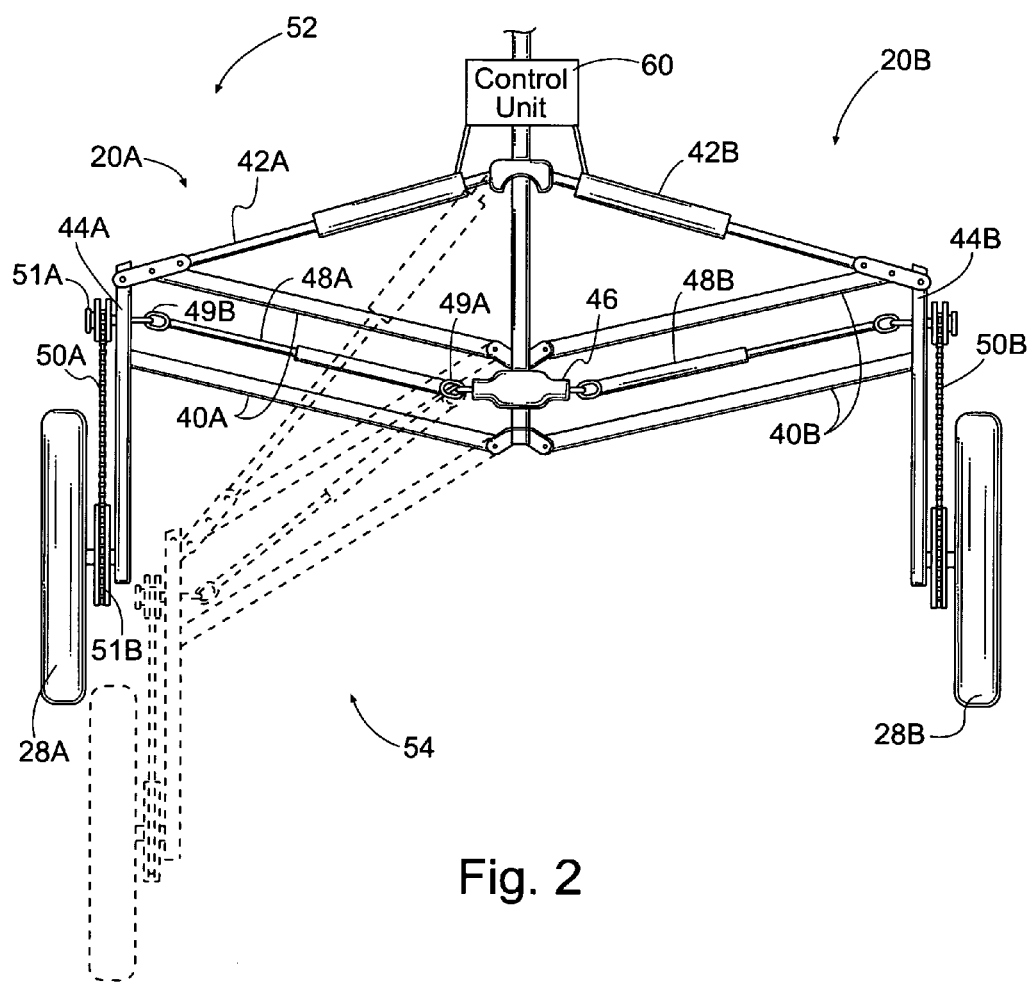
FIG. 2 is a front elevation view of the pair of landing gear assemblies of FIG. 1.

FIG. 2 is a front elevation view of the pair of landing gear assemblies 20A and 20B of FIG. 1. As shown in FIG. 2 the landing gear assembly 20A includes a pair of struts 40A and a hydraulic actuator 42A. The landing gear assembly 20A is pivotally attached to both the vehicle body 12 and an outer post 44A. Pivotally connected between the vehicle body 12 and upper and lower portions of the outer post 44A, the pair of struts 40A serve to keep the outer post 44A in vertical alignment as the outer post 44A moves up and down. The hydraulic actuator 42A is pivotally connected between the vehicle body 12 and the upper portion of the outer post 44A, and the wheel 28A is rotatably attached to the lower portion of the outer post 44A.

The landing gear assembly 20B is similar to the landing gear assembly 20A and includes a pair of struts 40B and a hydraulic actuator 42B. The landing gear assembly 20B is pivotally attached to both the vehicle body 12 and an outer post 44B. The pair of struts 40B serve to keep the outer post 44B in vertical alignment as the outer post 44B moves up and down. The hydraulic actuator 42B is pivotally connected between the vehicle body 12 and the upper portion of the outer post 44B, and the wheel 28B is rotatably attached to a lower portion of the outer post 44B.

In the embodiment of FIG. 2 a differential 46 is connected to the drive selector 30 of FIG. 1 and receives mechanical power from the motor 14 via the drive selector 30. A drive shaft 48A connected between the differential 46 and a chain drive 50A functions to drive the wheel 28A. In the preferred embodiment, the drive shaft 48A is connected to the differential 46 through a first linkage 49A, and to a sprag clutch 51A through a second linkage 49B mounted through the outer post 44A. The chain drive 50A operably connects the sprag clutch 51A to a gear 51B of the wheel 28A. In operation, the sprag clutch 51A enables the wheel 28A to be disengaged from the drive shaft 48A during landings of the fly-drive vehicle 10. For purposes of this application the term sprag clutch shall be defined to include other alternative mechanisms that are also suitable, including a centripetal clutch, or other suitable clutch mechanism. The term chain drive shall be defined to include belt drives and other similar or equivalent mechanisms.

An optional drive shaft 48B is shown connected between the differential 46 and an optional chain drive 50B to drive the wheel 28B. The drive shaft 48A and the optional drive shaft 48B serve as means for transferring mechanical power from the motor 14 to the respective chain drives 50A and 50B, thereby driving the wheels 28A and 28B.

The hydraulic actuator 42A functions as both a shock absorber and to transition the landing gear assembly 20A between a raised position 52 and a lowered position 54. Similarly, the hydraulic actuator 42B is used to absorb shocks and to transition the landing gear assembly 20B between a raised position and a lowered position. When the fly-drive vehicle 10 is taking off, flying, or landing, the hydraulic actuators 42A and 42B are preferably controlled by the user of the fly-drive vehicle 10. The user may advantageously put the landing gear assemblies 20A and 20B in the lowered positions for takeoffs and landings to provide ground clearance, and put the landing gear assemblies 20A and 20B in the raised positions while in flight to reduce aerodynamic drag.

In the embodiment of FIGS. 1 and 2 the landing gear assemblies 20A and 20B serve as means for raising and lowering the pair of rear wheels 28A and 28B with respect to the vehicle body 12. When the fly-drive vehicle 10 is in motion on the ground the hydraulic actuators 42A and 42B are preferably controlled by a control unit 60.

The control unit 60 is operably connected to the hydraulic actuators 42A and 42B to operably control the positions of the wheels 28A and 28B during operation of the fly-drive vehicle 10. For example, when the fly-drive vehicle 10 is moving forward in a straight line or turning at low speed, the control unit 60 may put the landing gear assemblies 20A and 20B in the raised positions. When the fly-drive vehicle 10 is making a right turn at high speed, the control unit 60 preferably puts the landing gear assembly 20A in the lowered position and the landing gear assembly 20B in the raised position so as to cause the vehicle body 12 to lean into the turn. Similarly, when the fly-drive vehicle 10 is making a left turn at high speed, the control unit 60 preferably puts the landing gear assembly 20A in the raised position and the landing gear assembly 20B in the lowered position so as to cause the vehicle body 12 to lean into the turn.

FIG. 3 is a side elevation view of another embodiment of the fly-drive vehicle 10 of FIG. 1 wherein the vehicle body 12 includes a partially enclosed canopy 56 and the rotor shaft assembly 16 is collapsible. The collapsible rotor shaft assembly 16 is described in more detail below.

In the embodiment of FIG. 3 the rotor 18 includes three separate rotors 18A, 18B, and 18C each having two blades. The rotors 18A–18C rotate about the same axis and in the same direction. In FIG. 3 the rotors 18A–18C are shown in an aligned configuration for storage. The rotors 18A–18C are preferably maintained in the aligned configuration when the fly-drive vehicle 10 is operated on the ground. A pair of braces 58A and 58B serve to maintain the rotors 18A–18C in the aligned configuration to prevent the rotor blades from bouncing during motion on the ground.

FIG. 4 is a top plan view of the rotors 18A–18C of FIG. 3 in the aligned configuration for storage when not in use. In FIG. 4 the rotors 18B and 18C are directly under the rotor 18A and are not visible. FIG. 5 is a top plan view of the rotors 18A–18C of FIG. 3 in an operational configuration for flight. In FIG. 5 the tips of the blades of the rotors 18A–18C are spaced apart by substantially equal distances.

Figure 6:
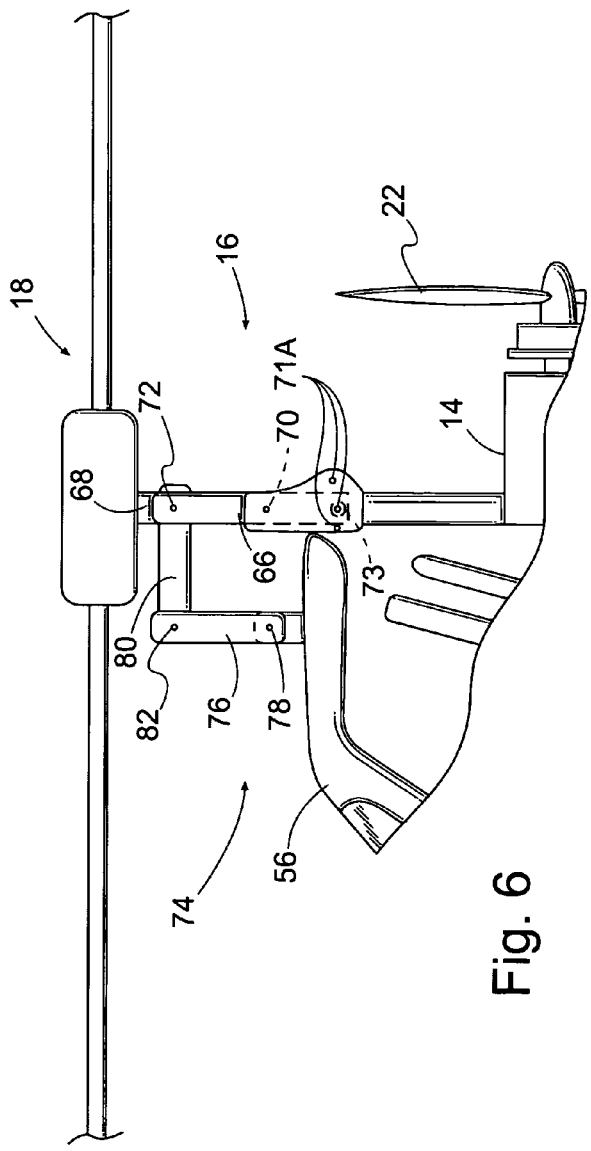
FIG. 6 is a partial side elevation view of a third embodiment of the fly-drive vehicle of FIG. 1 including the partially enclosed canopy of FIG. 3 and the collapsible rotor shaft assembly of FIG. 3, and wherein the rotor is a single rotor having two blades and the collapsible rotor shaft assembly is in an upright configuration.

FIG. 6 is a partial side elevation view of a third embodiment of the fly-drive vehicle 10 of FIG. 1 including the partially enclosed canopy 56 of FIG. 3 and the collapsible rotor shaft assembly 16 of FIG. 3. In the embodiment of FIG. 6 the rotor 18 is a single rotor having two blades.

The collapsible rotor shaft assembly 16 includes a lower portion 64, a middle portion 66, an upper portion 68, and a forward brace 74. The lower portion 64 is pivotally attached to the middle portion 66 via a first pivot 70, and the middle portion 66 is pivotally attached to the upper portion 68 via a second pivot 72. The lower portion 64 includes a locking aperture 71A (or in the preferred embodiment, a plurality of locking apertures, to enables adjustment of the assembly 16). The locking aperture is adapted to receive a locking bolt (not shown) for locking the collapsible rotor shaft assembly 16 in either an upright configuration (shown in FIG. 6) or a lowered configuration (shown in FIG. 7). The middle portion 66 preferably includes a resilient elastomeric bushing 73 that functions to absorb rotor pulses in the rotor shaft assembly 16.

The forward brace 74 includes a forward two-beam portion 76 and a lateral portion 80. The forward two-beam portion 76 is pivotally attached to the canopy 56 via a third twin pivot 78, and the lateral portion 80 is pivotally attached to the forward two-beam portion 76 via a fourth pivot 82. The lateral portion 80 is also pivotally attached to the middle portion 66 and to the upper portion 68 via the second pivot 72. The pivots 70, 72, 78, and 82 enable the rotor shaft assembly 16 to fold (i.e., collapse) between the upright configuration and the lowered configuration while maintaining a substantially horizontal orientation of the rotor 18. In FIG. 6 the collapsible rotor shaft assembly 16 is in the upright configuration.

Figure 7:
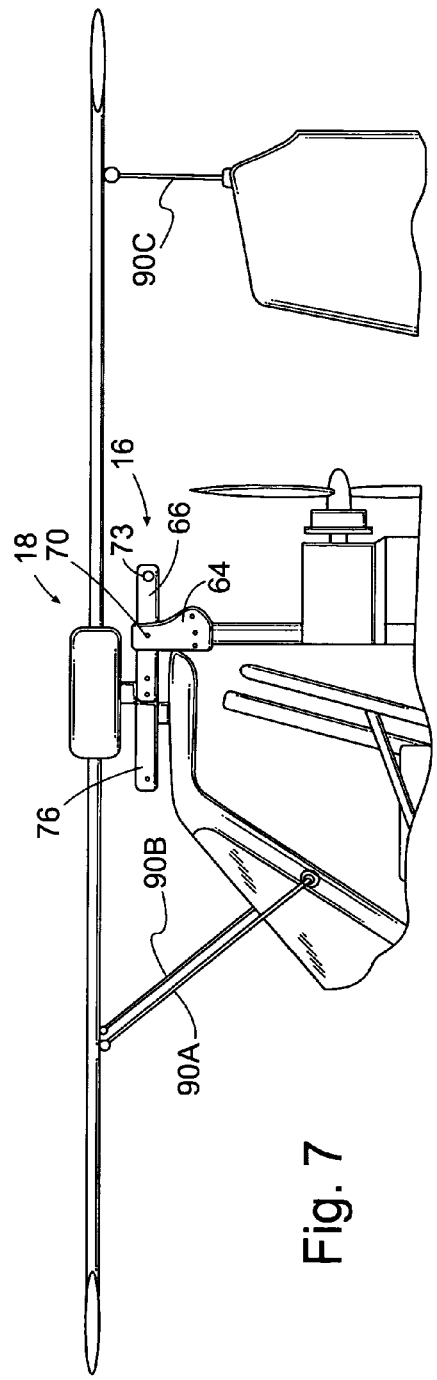
FIG. 7 is a partial side elevation view of a the fly-drive vehicle of FIG. 6 wherein the collapsible rotor shaft assembly is in a lowered configuration.

FIG. 7 is a partial side elevation view of a the fly-drive vehicle 10 of FIG. 6 wherein the collapsible rotor shaft assembly 16 is in the lowered configuration. In the embodiments of FIGS. 3, 6, and 7 the collapsible rotor shaft assembly 16 serves as a means for raising and lowering the rotor(s) 18 with respect to the vehicle body 12. In FIG. 7 three straps 90A, 90B, and 90C serve to maintain the rotor 18 in an aligned orientation with respect to the vehicle body and to prevent the rotor blades from bouncing during motion on the ground.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A fly-drive vehicle, comprising:
    a vehicle body;
    a motor mounted on the vehicle body;
    at least one rotor rotatably attached to the vehicle body;
    a pair of wheels each rotatably attached to a lower portion of the vehicle body;
    a pair of landing gear assemblies, each attached to the vehicle body, and comprising:
        an outer post, wherein one of the pair of wheels is rotatably connected to the outer post;
        a pair of struts pivotally connected between the vehicle body and the outer post; and
        a hydraulic actuator pivotally connected between the vehicle body and the outer post, wherein the hydraulic actuator is pivotally connected between the vehicle body and an upper portion of the outer post;
    a means for raising and lowering the rotor with respect to the vehicle body;
    a drive propeller rotatably coupled to the vehicle body;
    a means for selectively transferring mechanical power from the motor to at least one of the pair of wheels or to the drive propeller; and
    a front wheel control mechanism.

2. A fly-drive vehicle, comprising:
    a vehicle body;
    a motor mounted on the vehicle body;
    at least one rotor rotatably attached to the vehicle body;
    a pair of wheels each rotatably attached to a lower portion of the vehicle body;
    a means for raising and lowering the pair of wheels with resect to the vehicle body;
    a means for raising and lowering the rotor with respect to the vehicle body;
    a drive propeller rotatably coupled to the vehicle body;
    a means for selectively transferring mechanical power from the motor to at least one of the pair of wheels or to the drive propeller; and
    a front wheel control mechanism;
    wherein the means for raising and lowering the rotor with respect to the vehicle body comprises:
        a rotor shaft assembly attached to the vehicle body and comprising a lower portion, a middle portion, and an upper portion, wherein the lower portion is pivotally attached to the middle portion via a first pivot and the middle portion is pivotally attached to the upper portion via a second pivot, and
    wherein the rotor shaft assembly further comprises:
        a forward brace comprising a forward two-beam portion and a lateral portion, wherein the forward two-beam portion is pivotally attached to the vehicle body via a third twin pivot and the lateral portion is pivotally attached to the forward two-beam portion via a fourth pivot and to the middle and upper portions via the second pivot.

3. The fly-drive vehicle as recited in claim 2, wherein the first, second, third, and fourth pivots enable the rotor shaft assembly to be folded from an upright configuration to a lowered configuration.

4. The fly-drive vehicle as recited in claim 1, wherein the pair of wheels comprise rear wheels, and wherein the fly-drive vehicle further comprises a front wheel coupled to, and controlled by, the front wheel control mechanism, the front wheel being operably raised and lowered using a pair of hydraulic cylinders.

5. A fly-drive vehicle, comprising:
    a vehicle body;
    a motor mounted on the vehicle body;
    at least one rotor rotatably attached to the vehicle body;
    a pair of wheels;
    a pair of landing gear assemblies, each attached to the vehicle body and comprising:
        an outer post, wherein one wheel of the pair of wheels is rotatably connected to the outer post;
        a pair of struts pivotally connected between the vehicle body and the outer post;
        a hydraulic actuator means for raising and lowering the pair of wheels with respect to the vehicle body;
    a drive propeller rotatably coupled to the vehicle body;
    a means for selectively transferring mechanical power from the motor to at least one of the pair of wheels or to the drive propeller; and
    a front wheel control mechanism,
    wherein the means for selectively transferring mechanical power includes a drive shaft connected between the motor and at least one of the pair of wheels.

6. The fly-drive vehicle as recited in claim 5, wherein the drive shaft is connected to the at least one of the pair of wheels through a sprag clutch and a drive chain.

* * * * *